May 18, 1965  P. VAN ZONNEVELD  3,184,298

METHOD OF MANUFACTURING HOLLOW GLASS ARTICLES

Filed Sept. 8, 1960  3 Sheets-Sheet 1

INVENTOR
PIETER VAN ZONNEVELD

BY
AGENT

United States Patent Office 3,184,298
Patented May 18, 1965

3,184,298
METHOD OF MANUFACTURING HOLLOW
GLASS ARTICLES
Pieter van Zonneveld, Eindhoven, Netherlands, assignor to North American Philips Company, Inc., New York, N.Y., a corporation of Delaware
Filed Sept. 8, 1960, Ser. No. 54,775
Claims priority, application Netherlands, Sept. 11, 1959, 243,274
3 Claims. (Cl. 65—80)

The present invention relates to the manufacture by machine of hollow glass articles shaped so that they cannot normally be produced solely by machine in the usual manner, i.e.; a parison is blown out to shape in a mould or moulded by pressing. Examples of such articles are many kinds of drinking-glasses comprising a specially shaped bottom portion and a substantially vertical lateral wall which is thin in comparison with the bottom portion. Such articles cannot be produced by moulding a mass of soft glass under pressure since in this process the substantially vertical lateral wall must have a certain minimum thickness. It is also substantially impossible to produce such an article from a mass of glass which had previously subsided into a parison by blowing out to shape in a mould. By this process the thin substantially vertical lateral wall might be formed into a more or less correct shape but it is substantially impracticable to shape the bottom portion of the subsiding lump of glass into a sharply defined form. This becomes even more difficult if this bottom portion has a great thickness relative to the vertical wall.

It is the object of the present invention to provide a combined press-and-blow process for manufacturing such articles which can be carried out by machine.

Briefly the method according to the invention is characterized by premoulding a mass of glass to form a parison in which at least an outer surface of a part of the parison is given a substantially final shape. This surface of a part of the parison thus formed is maintained and supported in its given shape, and the upper end of the parison clamped in a holder, while the shaped part of the parison is allowed to subside. The preformed surface or part of the parison extending at a substantially right angle to the direction of subsidence is therefore maintained unchanged from its given shape while the remainder of the parison is drawn out to provide what may be called a second stage parison. The so-called second stage parison thus provided, approximates the shape of the final product. Final shaping of the object is accomplished by the well-known blow moulding technique, however it is noted that the pre-shaped part of the original parison is not changed by the blow moulding operation.

The term "part of the parison extending substantially at right angles to the direction of subsidence" is to be understood to mean particularly the lower portion of the parison, however, it may also mean other portions, for this part may alternatively be located at a level between the upper and lower ends of the parison. There may even be a number of portions extending at right angles to the direction of subsidence, viewed in the direction of length of the subsiding parison. This is the case in specially shaped envelope used in electrical engineering, for example, for X-ray tubes in which the longitudinal shape of the glass bulb shows stepped transitions.

The use of a receiving member is known in a method of manufacturing bottles by machine. However, although a receiving member with controlled movement cooperates with the lower end of the subsiding bottle parison, this member only exerts a braking influence on this parison. The lower end of this parison has such a mass relative to the remaining part that in the absence of a receiving member it would subside with an uncontrollable excessive speed relative to the holder in which the upper end of the parison is gripped. Thus, the shape of the upper surface of the receiving member may substantially be shaped in any convenient form, since the lower end of the parison, when it has reached a certain length and the receiving member is removed, is still soft and can be shaped by pressing a mandrel into its bottom.

In a further embodiment of the method in accordance with the invention, in pre-moulding the mass of glass part of the inner surface of the parison is also shaped at least substantially in the form of the inner surface of the corresponding part of the finished product. Hence, this method permits the manufacture of articles with a pre-determined internal shape. Thus, articles may be manufactured in which the inner and outer cross-sectional outlines are widely different. As an example we may mention an article the cross section of which has a circular external outline and a polygonal internal outline.

In the articles to be manufactured, a higher degree of accuracy can be obtained in the part of the finished product which is pre-shaped in the pre-moulding process of the mass of glass by using a further embodiment of the method in accordance with the invention. This is characterized in that the mass of glass before it is pre-moulded is arranged on the upper surface of the receiving member in the upper position thereof and there is subjected to the action of further pre-forming members.

The invention also relates to an embodiment of the above-mentioned method in which the parison, the upper end of which is clamped in the holder, is rotated about its longitudinal axis while the receiving member is rotated about its vertical axis. The angular velocities are equal in magnitude and in direction. This may be necessary if the subsiding parison is to be exposed to heating by means of stationary burners directed to the parison. When helical effects are to be provided in the substantially vertical lateral walls, however, the angular velocities of the parison and receiving member must be different.

The invention also relates to apparatus for carrying out the method. In a special embodiment thereof, this apparatus is provided with a blow-mould which is adapted to cooperate with the receiving member in the lowermost position thereof, in which this member forms the bottom part of said blow-mould.

When the apparatus has once been adjusted to the manufacture of a series of identical articles, these can substantially satisfy the same requirements of dimensional accuracy and shape owing to the method described.

By means of the method and the apparatus in accordance with the invention articles can be manufactured the bottom of which contains parts the thickness of which is at least four times the minimum thickness of the substantially vertical wall. Furthermore, articles can now be manufactured by machine which have abrupt transitions in the longitudinal outlines and/or the bottoms of which have sharp edged shapes.

In order that the invention may be readily carried out, embodiments thereof will now be described, by way of example, with reference to the accompanying diagrammatical drawings, in which FIGURES 1–5 relate to an embodiment in which a receiving member cooperates with a part of a mass of glass subsiding into a parison, which part extends substantially at right angles to the direction of subsidence. The figures show sequential stages.

FIGURES 6, 7 and 8 relate to an embodiment in which the receiving member forms part both of the members pre-forming the mass of glass and of the members by means of which a formed parison is blown out to a hollow article.

FIGURE 13 is a bottom plan view of FIGURE 12.

Figure 14:
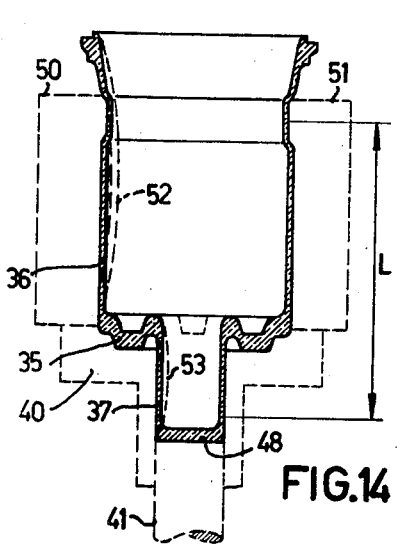
Figure 15:
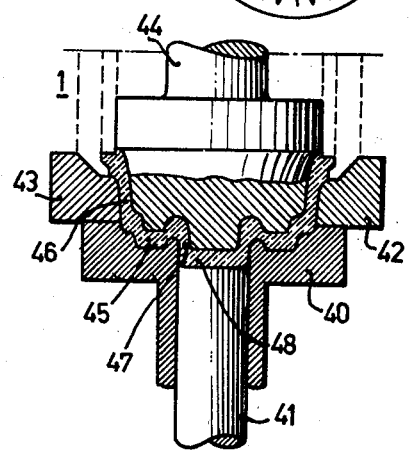

FIGURE 15 relates to the process of pre-moulding a mass of glass from which the article shown in FIGURE 14 can be made.

Figure 1:
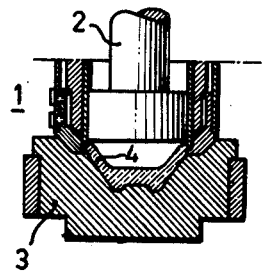

In the embodiment shown in FIGURES 1–5, reference numeral 1 denotes a holder in which a punch 2 is adapted to slide which can be made to cooperate with a pre-forming mould 3 in the arrangement shown in FIGURE 1. When a mass of glass is dropped in the mould 3, it can be moulded into a parison 4 by lowering the punch 2. When after the pre-forming of the mass of glass into a parison 4 the mould 3 is moved from the holder 1, the stamp or press 2 is raised and a receiving member 5 is moved to its upper position under the parison 4 as, we have the situation shown in FIGURE 2. A lower end 6 of the parison the upper end of which is gripped in the holder 1 will subside and descend to the upper surface 7 of the receiving member 5. By now lowering the receiving member 5 at a suitable speed it can be ensured that the lower end 6 of the parison 4 remains in engagement with the upper surface 7 of the receiving member 5. Any suitable known means may be utilized for lowering member 5. The mass of glass or parison 4 respectively can occupy the positions shown in FIGURES 2, 3 and 4.

As will be seen from FIGURES 1–5, during the pre-forming process of the parison 4 the lower end 6 thereof is formed into a shape corresponding at least substantially with that of the lower end of a finished article 8. If, now, the upper end 7 of the receiving member is also shaped into a form corresponding with that of the outside of the finished product, it can be ensured that the lower end 6 of the mass of glass after it has engaged the receiving member is substantially not deformed any further. During the further subsidence of the parison 4, in which process the bottom 6 is in continuous engagement with the receiving member, the parison can be formed into another or second stage parison while air under pressure and/or heat may be supplied. (Note FIG. 9.) When the receiving member has reached its lowermost position, it is removed only when the material engaging it is no longer kneadable. The upper surface of the receiving member 5 may be maintained at a low temperature by water cooling in any suitable manner. Thus, the bottom 6 of the parison 4 during its continuous engagement with the upper surface of the receiving member is cooled at a higher rate than a lateral wall 9 which is formed during the subsidence of the parison. After removal of the receiving member 5, the second parison which is still provided with a pre-formed bottom part (FIGURE 4) may be surrounded by a blow-mould comprising parts 10, 11 and 12, in which it is blown up to a hollow glass article 8 in the apparatus shown in FIGURE 5. When the said blow-mould parts are removed, the blown article 8 can be ejected from the holder 10 in a manner described more fully hereinafter. The article now has an upper rim 13 which can be removed therefrom in any suitable manner but preferably by the provision of a stressed rim and subsequent pinching.

Figure 2:
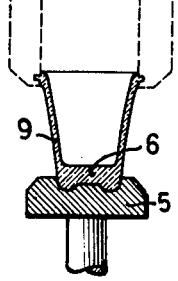
Figure 3:
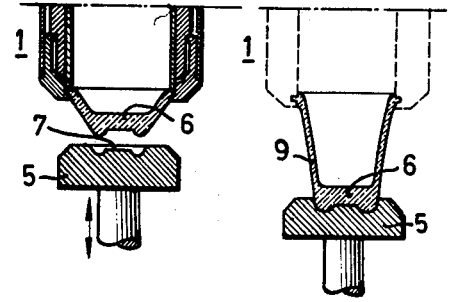
Figure 4:
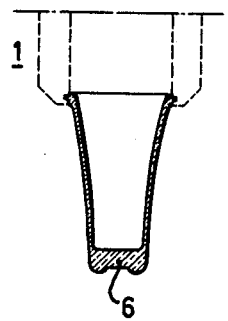
Figure 5:
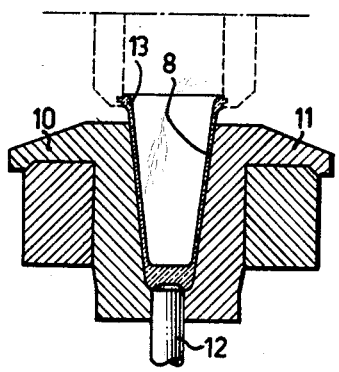

During the time interval between the removal of the pre-forming mould 3 and the reception of the mass of glass 4 on the receiving member 5, the glass gripped in the holder according to FIGURE 2 can slightly subside. During this subsidence the bottom 6 may assume a slightly different shape.

It has been found that any change of shape is substantially compensated when the bottom 6 is in engagement with the upper surface 7 of the receiving member.

If the parison during subsidence is to be subjected, for example laterally, to heating, the holder 1 and the receiving member 5 may be rotated. Due to the continuous engagement between parison 4 and receiving member 5 during the subsidence of the parison, it is desirable that the parison and the receiving member should be rotated with angular velocities of equal value and direction. However, if the article 8 to be manufactured is to be longitudinally twisted in order to produce helical effects in the substantially vertical wall, the angular velocities should preferably be different.

It has been found that due to the fact that the comparatively thick bottom part of the finished article 8 is already shaped in the pre-formed mass of glass or parison 4 and subsequently, when arranged on the receiving member, is substantially not subjected to deformation, the above-described press-and-blow process can successfully be employed for the manufacture of hollow glass articles which may have a bottom part with slight dimensional tolerances both in the inner and outer shapes, which may be widely different from one another.

Figures 6, 7, 8:
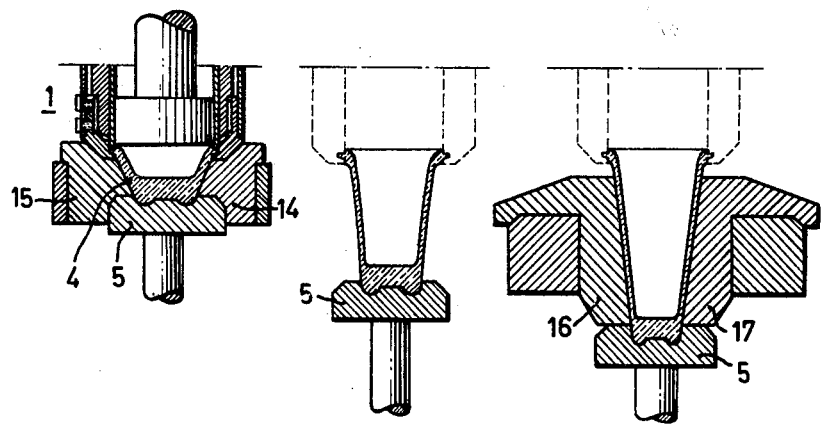

For obtaining an even higher dimensional accuracy of the bottom part of the glass article 8, use can be made of an apparatus as shown in FIGURES 6, 7 and 8. In this apparatus, the receiving member 5, in its uppermost position, also acts in the pre-forming process of the mass of glass 4 as the bottom part of the pre-forming mould which comprises two separable parts 14 and 15 (FIGURE 6). In this arrangement, the receiving member 5 is not immediately removed when the lower part of the parison is no longer plastic but in its lowermost position this member also forms part of a blow-mould further comprising separable parts 16 and 17 (FIGURE 8). It will be appreciated that the receiving member need not absolutely form part of the blow-mould. A combination of the two arrangements may also be employed. In this event, FIGURES 8 and 5 must be interchanged.

Figure 9:
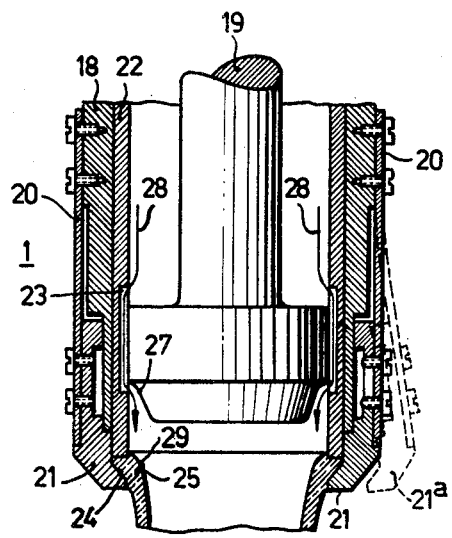
FIGURE 9 shows part of the construction of the holder by means of which a mass of glass or parison is gripped by its upper end.
Figure 10:
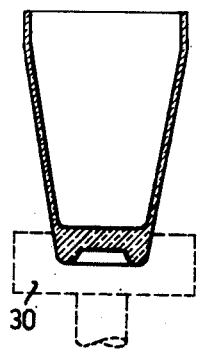
FIGURES 10–14 show hollow glass articles which can be manufactured by the method and the arrangement in accordance with the invention.
Figure 11:
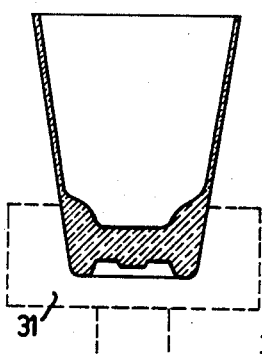
Figure 12:
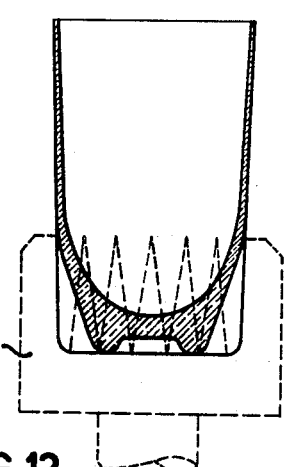
Figure 13:
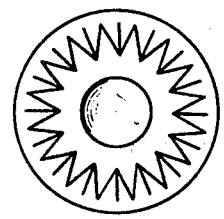

The construction of the holder 1 is illustrated in FIGURE 9. The holder contains a sleeve 18 enclosing a second sleeve 22. In this sleeve 22 a punch 19 is adapted to slide. Furthermore provision is made of a number of jaws 21 secured to resilient strips 20 and together constituting a continuous ring in the "closed position" shown. In the "open position" of these jaws, 21a, this is not the case. The upper part of a parison 4 clamped in the sleeve is designated 25. The sleeve 22 is provided with a number of axial recesses 23. In the position shown of the punch 19 air under pressure can be supplied at the base of this punch according to arrows 28 for blowing up a parison clamped in the holder. Subsequently, after removal of the separable blow-mould parts, the article can be removed by lowering the punch 19 in the sleeve 22. A part 27 of this punch exerts pressure on a rim at 29 of the article clamped in the holder. This pressure is transmitted by the material 25 of the article to the oblique edge 24 of the jaws 21 constituting a "closed" ring. As a result the jaws 21 are pressed apart into the position 21a against the spring action of the strips 20. When these jaws are sufficiently displaced, the article can be pushed down from the holder 1 by the punch 19. Since in the process described hot glass engages parts of the pre-forming members, of the receiving member and the blow-mould, it is desirable that the temperature of these parts should not rise considerably. This can be ensured by providing them with a water cooling system. Since such systems are generally known, this will not be described more fully.

As an example of the hollow glass article to be manufactured we have discussed so far a drinking-glass having a thin, substantially vertical lateral wall and a comparatively thick bottom part. Examples of other hollow glass articles which can be manufactured successfully by the method and apparatus hereinabove described are shown in FIGURES 10 to 14. FIGURES 10 to 13 relate to drinking glasses which on the one hand have a shaped and/or thick bottom portion formed by pressing in a mould and on the other hand in view of the fact that they comprise a thin substantially vertical lateral wall formed by blowing a mass of glass subsided to a parison into shape in a blow-mould. In the combined press-and-blow process according to this invention these articles can be manufactured so that the advantages of both the pressing and the blowing processes are attained. The longitudinal outline of the articles shown in FIGURES 10 and 11 has abrupt transitions. The article shown in FIGURES 12 and 13 has a bottom shaped with sharp edges. In these figures, receiving members 30, 31 and 32 by broken lines. FIGURE 14 shows a hollow glass article in which the part of the finished article already provided in pre-forming of the mass of glass is not the bottom portion. The article to be manufactured, from which subsequently a product having a length L is obtainable by this press-and-blow process, comprises a thick annular portion 35 of particular shape, intermediate two cylindrical walls 36 and 37. This article is manufactured by a process substantially similar to that described hereinbefore with respect to a drinkingglass. Use may be made of a receiving member comprising an annular portion 40 and a pin 41 capable of sliding therein. This receiving member can cooperate in the manner shown in FIGURE 15 with a pre-forming mould comprising parts 42 and 43. The arrangement further contains the holder 1 described in which a punch 44 of different shape is adapted to move. In the manufacture of the article shown in FIGURE 14 it must be ensured that the pre-formed mass of glass contains a portion 45 corresponding to the annular portion 35 of the finished article, while furthermore portions 46 and 47 are provided in this pre-formed mass which subsequently are shaped into the corresponding parts 36 and 37 of the finished article. After the mass of glass has been pre-formed, the members 42 and 43 are removed while the punch 44 is raised so that the pre-formed mass while being held in the holder 1 is enabled to subside into a parison similarly as has been described hereinbefore. The descending movement of the receiving member must be such that the annular portion 45 of the pre-formed mass continuously remains in engagement with the upper surface of the receiving member 40, while the relatively movable parts 40 and 41 must be controlled so that in the lowermost position of the annular part 40 the pin 41 assumes a lower position (FIGURE 14). When the receiving member 40 is being lowered, the annular portion 45 of the parison is substantially not exposed to deformation. The cylindrical lateral wall 37 can be shaped in that a bottom portion 48 provided in the pre-forming process is free to subside on to the upper surface of the pin 41 away from the annular portion 45 since this pin descends at a higher rate than the part 40. When the receiving member 40 has reached its lowermost position, blow-mould parts 50 and 51 can be closed about the subsided parison. The cylindrical portions 36 and 37 of the ultimate hollow glass article can now be produced by blowing out in the blow-mould comprising parts 50, 51, 40 and 41. The lateral walls 52 and 53 of the parison are formed by subsidence.

What is claimed is:

1. A method of forming hollow glass objects having a thick configured wall and an obliquely contiguous relatively thin wall comprising the steps of mechanically pressing a mass of molten glass for forming a cup like parison having a thick wall portion of substantially the final shape thereof, holding the upper extremities of said parison adjacent the open end of the cup thus formed, elongating said parison to subside said parison while contacting at least the said thick wall portion formed by pressing and elongating the thin wall portions of said object, and subsequently finally forming the elongated thin wall portion of said parison by blow moulding.

2. A method of forming hollow objects comprising the steps of pressing a mass of molten glass into a generally cup shaped parison having a configured substantially horizontal thickwall portion in which the exterior surface is finally formed by said pressing step, contacting said exterior surface to maintain the pressed shape of said surface, elongating said parison to subside said parison in a substantially vertical direction while continuing to contact said exterior portion to form the thick portion and preform at least a contiguous thin wall portion of said object, and blow moulding said thin wall portion to its final shape while continuing to support said exterior surface to maintain its pressed shape.

3. A method of forming hollow objects comprising the steps of pressing a mass of molten glass into a generally cup shaped parison having a configured annular thick wall portion, contacting said annular thick wall portion to support the pressed shape of said annular portion, elongating said parison to subside said parison while continuing to support said pressed shape to form the thick portion of said object and preform the thin wall portions of said object; said thin wall portions being contiguous with the inner and outer margins of said annular thick wall portion, and blow moulding said thin wall portions to finally shape said object while continuing to contact and support said configured annular thick wall portion.

References Cited by the Examiner

UNITED STATES PATENTS

| | | | |
|---|---|---|---|
| 428,712 | 5/90 | Boyer | 65—229 |
| 466,894 | 1/92 | McElroy | 65—66 |
| 648,746 | 5/00 | Houser | 65—229 |
| 703,618 | 7/02 | Sievert | 65—63 |
| 792,500 | 6/05 | Cox | 65—361 X |
| 1,603,524 | 10/26 | Dunbar | 49—80 |
| 1,618,747 | 2/27 | Bartlett | 49—80 |
| 1,778,735 | 10/30 | Soubier | 65—229 X |
| 1,778,743 | 10/30 | Williams et al. | 65—229 X |
| 1,896,870 | 2/33 | Smith | 65—76 |
| 1,914,169 | 6/33 | Rowe | 65—76 |
| 2,030,328 | 2/36 | Schutz | 65—212 |
| 2,205,382 | 6/40 | Garwood | 65—224 X |
| 2,238,803 | 4/41 | Berthold et al. | 65—71 |
| 2,469,130 | 5/44 | Rodman | 18—55 X |

FOREIGN PATENTS 60,459 1/48 Netherlands.

DONALL H. SYLVESTER, *Primary Examiner.*

ARTHUR P. KENT, *Examiner.*